(12) United States Patent
Kittilsland et al.

(10) Patent No.: US 9,080,870 B2
(45) Date of Patent: Jul. 14, 2015

(54) MEMS STRUCTURE FOR AN ANGULAR RATE SENSOR

(75) Inventors: Gjermund Kittilsland, Horten (NO); Daniel Lapadatu, Horten (NO); Sissel Jacobsen, Horten (NO)

(73) Assignee: SensoNor AS (NO)

( * ) Notice: Subject to any disclaimer, the term of this patent is extended or adjusted under 35 U.S.C. 154(b) by 296 days.

(21) Appl. No.: 13/639,376

(22) PCT Filed: Apr. 15, 2011

(86) PCT No.: PCT/EP2011/056057
§ 371 (c)(1), (2), (4) Date: Oct. 4, 2012

(87) PCT Pub. No.: WO2011/128449
PCT Pub. Date: Oct. 20, 2011

(65) Prior Publication Data
US 2013/0019680 A1    Jan. 24, 2013

(30) Foreign Application Priority Data

Apr. 16, 2010  (EP) ..................................... 10160201

(51) Int. Cl.
*G01C 19/56* (2012.01)
*G01C 19/5712* (2012.01)

(52) U.S. Cl.
CPC ................................. *G01C 19/5712* (2013.01)

(58) Field of Classification Search
CPC ................................................... G01C 19/5712
USPC ...................................................... 73/504.12
See application file for complete search history.

(56) References Cited

U.S. PATENT DOCUMENTS 7,454,971 B2    11/2008   Blomqvist
2005/0082252 A1    4/2005   Nasiri

*Primary Examiner* — John Chapman, Jr.
(74) *Attorney, Agent, or Firm* — Hovey Williams LLP

(57) ABSTRACT

A micro-electromechanical system (MEMS) structure for an angular rate sensor includes seismic masses arranged to have a first degree of rotational freedom about an axis that is substantially perpendicular to the plane of a silicon substrate, and a second degree of rotational freedom about an axis substantially coincident with the longitudinal axis of driving beams to which the seismic masses are attached. A sensing system is arranged such that, when the structure is subjected to an angular velocity around a third axis that is substantially in the plane of the silicon substrate and perpendicular to the longitudinal axis of the beams, a Coriolis force arises which causes the secondary oscillation of the seismic masses.

14 Claims, 11 Drawing Sheets

MEMS STRUCTURE FOR AN ANGULAR RATE SENSOR

The invention relates to an arrangement for measuring angular velocity. More specifically, the invention relates to a fully symmetrical MEMS structure for an angular rate sensor having a double-sided implementation to provide high-precision and high-stability.

There is a considerable need for high-precision and high-stability angular rate sensors for a variety of electronic measuring systems. Existing angular rate sensors include vibrating angular velocity meters, or gyroscopes (gyros), which use vibrating members, such as a tuning fork, and are constructed and tested in metal, quartz and silicon. Quartz- and silicon-based gyros are preferred over the metal-based gyros because they can be miniaturised and manufactured relatively cheaply in large production runs by batch manufacture.

Tuning fork type gyros require arrangements with at least two orthogonal degrees of freedom. In such devices, a certain known primary motion, corresponding to the first degree of freedom, must be generated and maintained in the sensor. An external angular velocity affecting the sensor in a direction perpendicular to the primary motion induces oscillating Coriolis force in a direction corresponding to a second degree of freedom. The induced Coriolis force is proportional with the external angular velocity and the amplitude of the primary motion. It is therefore advantageous to generate and maintain a primary oscillation with large amplitude, best achieved by structures sealed in vacuum and exhibiting high quality factors.

Such tuning fork type gyros can be made to vibrate in various arrangements of dynamically balanced modes, which make such devices insensitive to vibrations and linear accelerations. They may be constructed with open loop, closed feedback or a combination of both.

Some existing devices employ electrostatic excitation of an element and then detect capacitively the movement induced by the Coriolis force. Owing to the remarkable electro-mechanical features of silicon, these devices have generally been manufactured using silicon wafers, silicon-on-insulator wafers or poly-silicon.

Commonly, in silicon-based gyros, electrostatic excitation is applied at right angles to the substrate surface. However, existing micromechanical gyros using such an arrangement, such as disclosed in U.S. Pat. Nos. 7,1325,451 and 7,454,971, although being relatively easy to produce, exhibit lower gyroscopic scale factor.

This problem can be addressed by using beams that have a tendency to bend in a direction that is substantially parallel to the plane of the substrate, thus allowing primary motions with large oscillation amplitudes, such as the asymmetric beams taught in EP-A-1467179.

Furthermore, a limitation in many existing arrangements is the presence of non-uniform characteristics and built-in stress that can cause unintended sensitivity to external mechanical and thermal loads or unpredictable drift of characteristics. This problem has previously been addressed either by use of stress-release structures, pedestals or beam systems, or by a careful choice of materials. For example, EP-A-1096260 discloses a micromechanical device characterised by the use of pedestal members, while U.S. Pat. No. 7,454,971 discloses several arrangements characterised by the use of both pedestals and stress-release beams.

Another limitation of the arrangements according to prior art vibrating gyros is the existence of uncompensated quadrature signals.

The object of the present invention is to provide an angular rate sensor having improved precision and stability, which enables reliable and efficient measuring of angular velocity, particularly in compact oscillating device solutions, and which is considerably less sensitive to the mechanical and thermal interference compared with prior art solutions.

According to the present invention there is provided a micro-electromechanical system (MEMS) structure for an angular rate sensor, the structure being positioned between first and second silicon-insulator composite wafers formed of a plurality of structured silicon parts, electrically isolated from each other by an insulator material, the structure comprising; a mono-crystalline silicon substrate structured to form a sensing system and a frame, the sensing system being completely de-coupled from and surrounded by the frame, which is positioned between engaging surfaces of the first and second composite wafers such that the sensing system is hermetically sealed within a cavity defined by the first and second composite wafers and the frame, the sensing system including: two seismic masses having front and back surfaces; two driving beams, each having a first end attached to a seismic mass and a second end attached to the first and second composite wafers by means of fixed pedestals provided on the silicon substrate; and a bending spring arranged to directly connect between, and synchronise a primary motion of, the two seismic masses, each of the seismic masses being arranged to have a first degree of rotational freedom about an axis that is substantially perpendicular to the plane of the silicon substrate, and the seismic masses and driving beams being arranged to have a second degree of rotational freedom about an axis substantially coincident with the longitudinal axis of the driving beams; means for generating and detecting the primary motion consisting of a primary oscillation of the two seismic masses, in opposing phases, in the first degree of rotational freedom; and means of detecting a secondary motion consisting of a secondary oscillation of the two seismic masses, in opposing phases, in the second degree of rotational freedom, the means of generating and detecting the primary motion and the means of detecting a secondary motion being provided on both the front and back surfaces of each of the first and second seismic masses, wherein the sensing system is arranged such that, when the device is subjected to an angular velocity around a third axis that is substantially in the plane of the silicon substrate and perpendicular to the longitudinal axis of the beams, a Coriolis force arises which causes the secondary oscillation of the seismic masses.

The present invention provides for a structure for an angular rate sensor having double-side excitation and detection which can achieve considerably improved accuracy and stability, from the usage of several compensation electrodes properly positioned on opposing planar surfaces of the seismic masses, when compared with existing arrangements and thus addresses the problem of non-uniform characteristics and un-compensated quadrature signals.

In the present invention, dedicated pairs of electrodes are used to match the frequencies of the primary and secondary oscillations in order to achieve the targeted precision. The frequency matching is realised by applying a tuneable, continuous voltage between "adjustment" electrodes and the seismic masses, combined with a suitable algorithm implemented in the associated electronic circuit.

Preferably, the engaging surface of the first silicon-insulator composite wafer matches, or mirrors, the engaging surface of the second silicon-insulator composite wafer.

Preferably, the seismic masses, the pedestals and the means of detecting the primary and secondary motions are symmetrically disposed about perpendicular axes.

Preferably, the seismic masses and driving beams have substantially identical thicknesses and the main symmetry axes of the seismic masses substantially coincide with the symmetry axes of the driving beams.

Preferably, the seismic masses have identical geometry.

Preferably, the driving beams and the bending spring have identical cross-sections.

Preferably a symmetry axis of the seismic masses substantially coincides with the third axis.

Preferably, the cross-section of each of the driving beams exhibits a geometrical asymmetry such that the primary oscillation may be initiated by an excitation force that is substantially perpendicular to the plane of the silicon substrate.

Alternatively, the cross-section of each of the driving beams exhibits full symmetry such that the primary oscillation may be initiated by an excitation force that is substantially parallel to the plane of the silicon substrate.

Preferably, the primary oscillation is generated and detected in a capacitive manner using at least two fixed "excitation" electrodes located above and below each seismic mass, while the secondary oscillation is detected in a capacitive manner using at least two fixed "detection" electrodes located above and below each seismic mass.

Preferably, the angular rate sensor further comprises means for adjusting the frequency of the oscillations with the frequency adjustment being achieved in a capacitive manner using at least two fixed "adjustment" electrodes located above and below each seismic mass.

Preferably, the angular rate sensor further comprises means for compensating the parasitic quadrature oscillations, the quadrature compensation being achieved in a capacitive manner using at least four fixed "compensation" electrodes located above and below each seismic mass.

Preferably, the electrodes of the same kind are symmetrically disposed with respect to the symmetry axes of the seismic masses and driving beams.

Preferably, the gap of the capacitors is realised by providing recesses on the front and back surfaces of the seismic masses.

According to the present invention, each silicon-insulator composite wafer comprises mono-crystalline silicon parts separated by insulator material. The mono-crystalline silicon parts form fixed electrodes of the capacitors and shielding or screening electrodes in electrical contact with the movable masses, with the insulator material providing electrical isolation between the electrodes. The insulator material can be glass or silicon dioxide, for example.

The structure is, ideally, provided with internal electrical contacts between the electrodes of the capping composite wafers and the elements of the silicon substrate. These internal electrical contacts are conveniently accommodated in recesses manufactured on either surfaces of the silicon substrate and typically comprise at least two metallic layers pressed together, such as, but not restricted to, Al/Al, Ti/Al, thermo-compression bonding metal systems or eutectic bonding metal systems. The structure is also provided with means for forming an external electrical contact with the electrodes.

Preferably, the structure further comprises stress-release means, such as silicon springs. The stress-release means may be attached on at least two opposing sides of the device, or interposed between each end of the bending spring and the adjacent seismic mass, or interposed between each seismic mass and its adjacent driving beam.

Preferably, the structure according to the present invention further comprises a getter material that helps preserve the high vacuum inside the hermetically sealed cavity.

Preferably, with the structure according to the present invention, stoppers are provided on the seismic masses and arranged to face the electrodes of the first and second composite wafers.

Preferably, the frame and sensing system are both formed from a single crystal silicon substrate.

Advantageously, the first and second composite wafers have a fully symmetrical structure. An arrangement in accordance with the invention may be used for platform stabilisation, positioning, guiding and navigation.

An example of the present invention will now be provided, with reference to the attached figures, in which.

Figure 1:
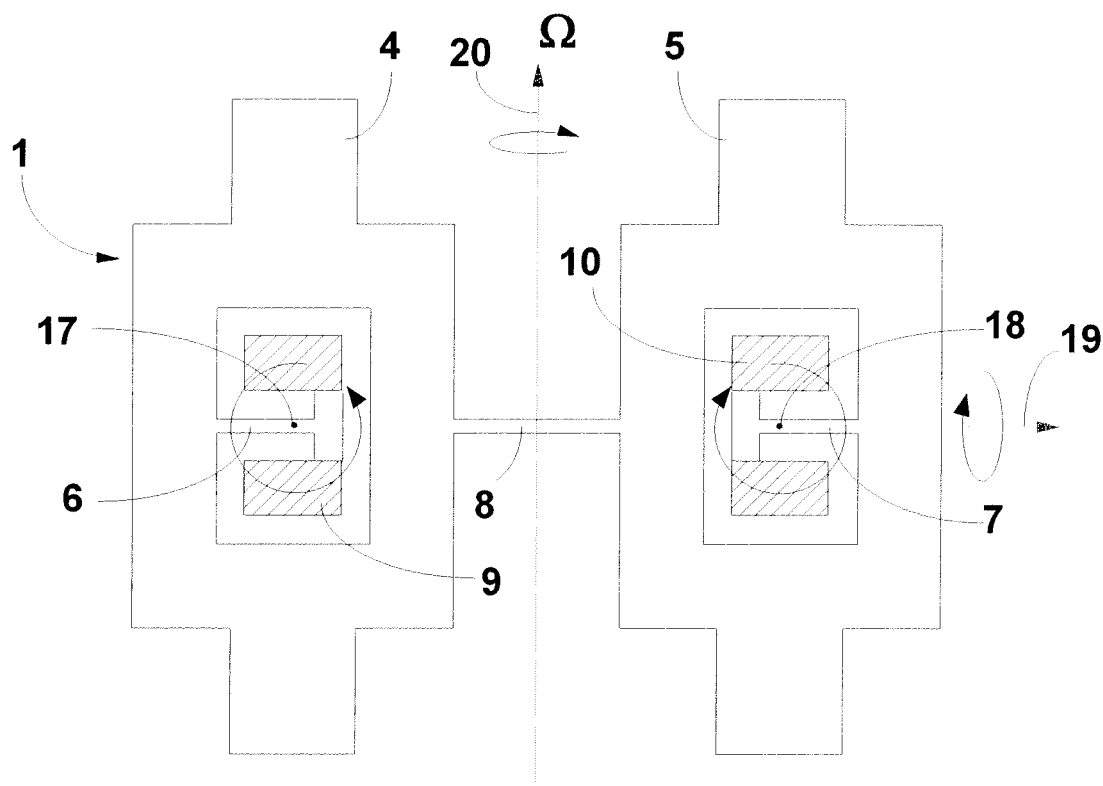
FIG. 1 shows a top view of a MEMS structure according to the present invention.

Referring to FIG. 1, an angular rate sensor according to the present invention comprises two, preferably identical, seismic masses 4, 5 connected by support beams 6, 7, 8. The beams and masses are of substantially equal thickness and are fabricated preferably by means of high-aspect-ratio micro-machining in a mono-crystalline silicon substrate 1. The geometry of the beams 6, 7, 8 is, in this example, selected such that the beams have a tendency to bend in a direction that is substantially parallel to the plane of the substrate 1.

The masses 4, 5 are attached to two of the support beams 6, 7, which act as driving beams. These driving beams 6, 7 are in turn attached to the two composite wafers 2, 3 by at least two pedestals 9, 10, 11, 12 located in the centre and on both the front and back surfaces of the silicon substrate 1. The two masses 4, 5 are connected to each other by bending spring 8, centrally located, for mechanically synchronizing the primary motion of masses 4, 5.

Figure 2A:
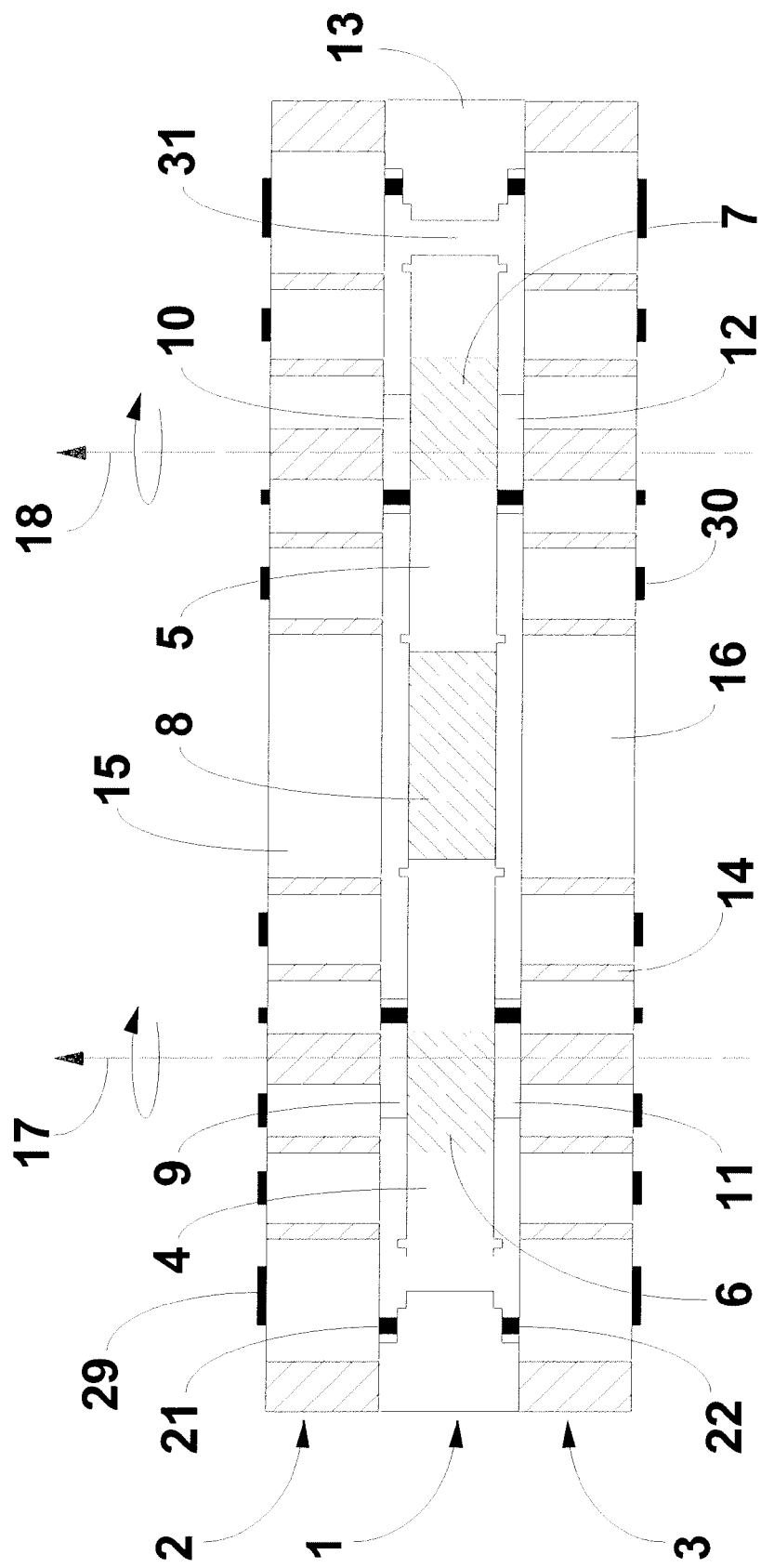
FIGS. 2A and 2B show two mutually perpendicular cross-sectional views of an angular rate sensor comprising a MEMS structure according to the present invention.

Referring to FIG. 2A, the structure formed by the silicon masses 4, 5 and the beams 6, 7, 8 is hermetically sealed between two capping silicon-insulator composite wafers 2, 3. A silicon frame 13, preferably also provided by the substrate 1, is sandwiched between the composite wafers 2, 3 to surround the structure contained within. The frame 13 and pedestals 9, 10, 11, 12 are attached to the composite wafers 2, 3 by means of a suitable bonding technique such as, but not restricted to, anodic, eutectic, thermo-compression, plasma-activated or direct bonding. Accordingly, the capping composite wafers 2 and 3, together with the frame 13, which surrounds the moveable structures while not being directly connected to any of them, define a hermetically sealed cavity 31.

The composite wafers 2 and 3 contain, ideally, fully symmetrical patterns of silicon parts 15, 16, separated from each other by isolation inserts 14, wherein the composite wafers 2, 3 have matching engaging surfaces. In other words, the first composite wafer 2 has an engaging surface which mirrors an engaging surface of the second composite wafer 3. The silicon parts 15, 16 form electrodes, which may be electrically connected to the masses 4, 5 by means of internal electrical contacts 21, 22, provided in recesses 25, 26 formed in the silicon substrate 1. The internal contacts 21, 22 are preferably formed by two metallic layers being pressed together, such as Al/Al, Ti/Al, thermo-compression bonding metal systems or eutectic bonding metal systems. The isolation inserts 14 provide electrical isolation between the silicon electrodes 15, 16. Contact pads 29, 30 are provided on outer surfaces of silicon portions 15, 16 in the composite wafers 2, 3 for external electrical connections.

The isolation inserts 14 are, preferably, realised from borosilicate glass, which in combination with anodic bonding as sealing technique has the ability to seal hermetically the silicon-glass interfaces that exist inside the silicon-insulator composite wafers 2, 3. Anodic bonding is therefore the preferred sealing technique, although other suitable sealing techniques may, of course, be used. Alternatively, the isolation inserts 14 may be realised from silicon oxide or other insulator materials.

Figure 2B:
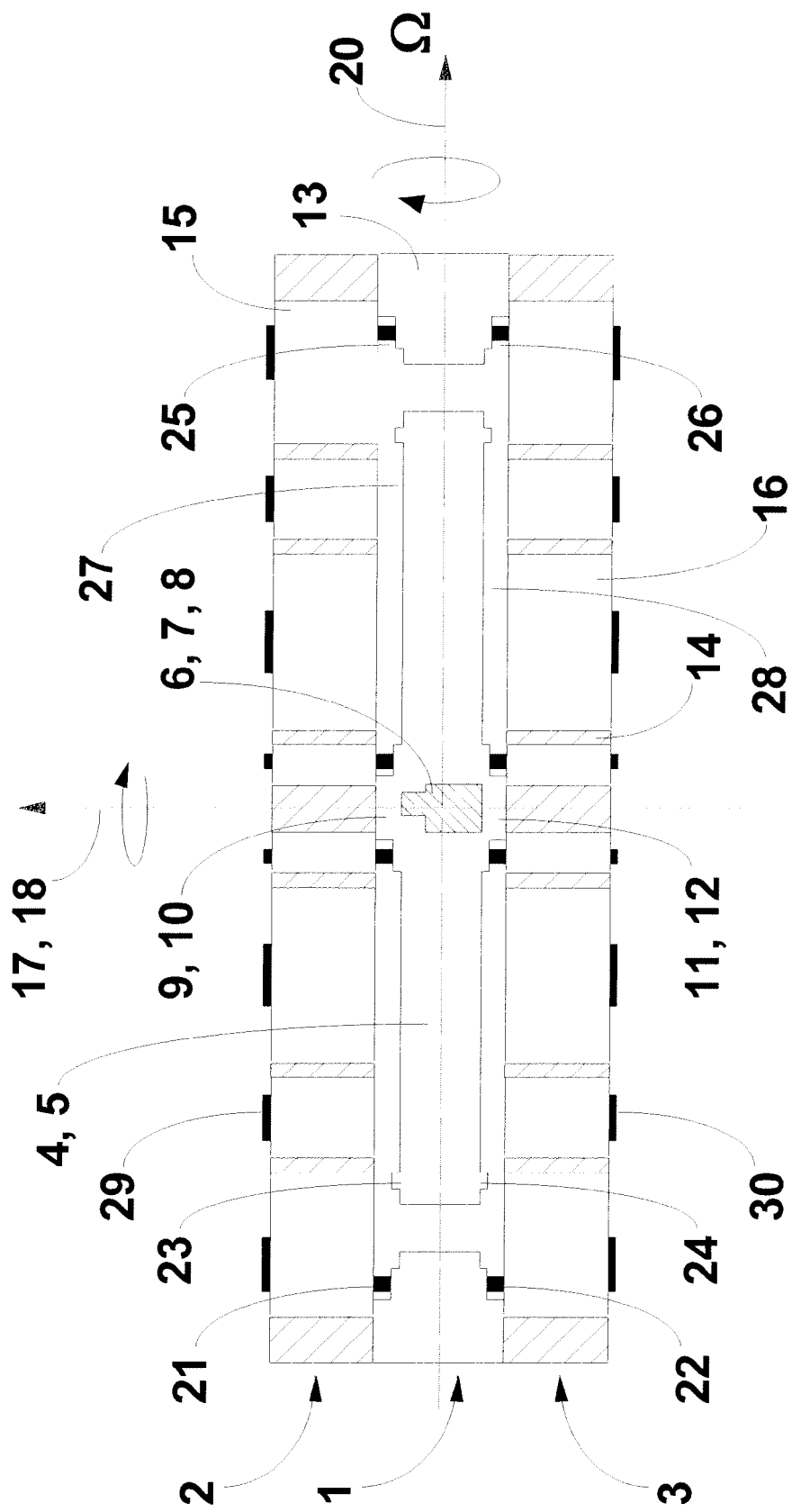

Referring to FIG. 2B, it can be seen that the masses 4, 5 have corresponding recesses 27, 28 formed on opposing front and back surfaces of the silicon substrate 1, the recesses serving as capacitance gaps. Silicon stoppers 23, 24 are provided along the silicon substrate 1 at dedicated locations within the recesses 27, 28 for preventing stiction and accidental electrical short-circuiting.

The masses 4, 5 and the beams 6, 7, 8 are arranged to provide a first degree of rotational freedom about axes 17, 18, which are substantially perpendicular to the plane of the substrate 1 in the mass centres of the seismic masses 4, 5, as shown, for example, in FIG. 1, and a second degree of rotational freedom about an axis 19, which is substantially coincident with the longitudinal axis of the beams 6, 7, 8, as shown, for example, in FIG. 1. This arrangement thus enables the component to operate as an angular rate sensor.

The driving beams 6, 7 are dimensioned in such a way that the resonance frequency of the in-plane bending mode substantially matches the resonance frequency of the torsion mode. Henceforth, the in-plane bending mode will be referred as "primary" or "excitation" mode, while the torsion mode will be referred as "secondary" or "detection" mode.

Figure 3:
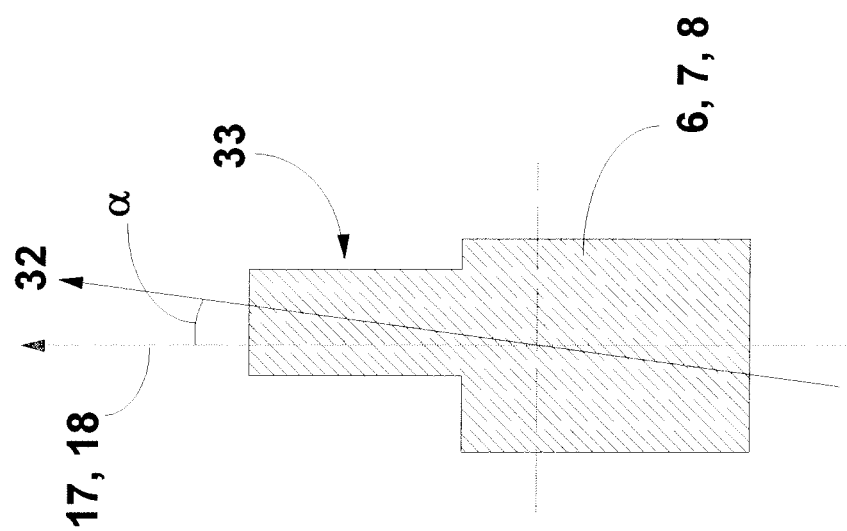
FIG. 3 shows a cross-sectional view of an asymmetric beam.

The beams 6, 7, 8 all have a substantially identical and, preferably, asymmetrical cross-sectional geometry, as illustrated in FIG. 3. However, a rectangular cross-section, as illustrated in FIG. 4, may also be used.

Referring to FIG. 3, the neutral axis 32 of the asymmetric beams 6, 7, 8 forms an acute, non-zero angle α with the normal axes 17, 18. The beams 6, 7, 8 have a tendency to bend in a direction that is substantially parallel to the plane of the substrate 1, so that the primary oscillation may be initiated by an excitation force that is substantially perpendicular to the plane of the substrate 1. The location of a narrower portion 33, with respect to the edges, of the beam 6, 7, 8 can be optimised for each specific application.

Figure 4:
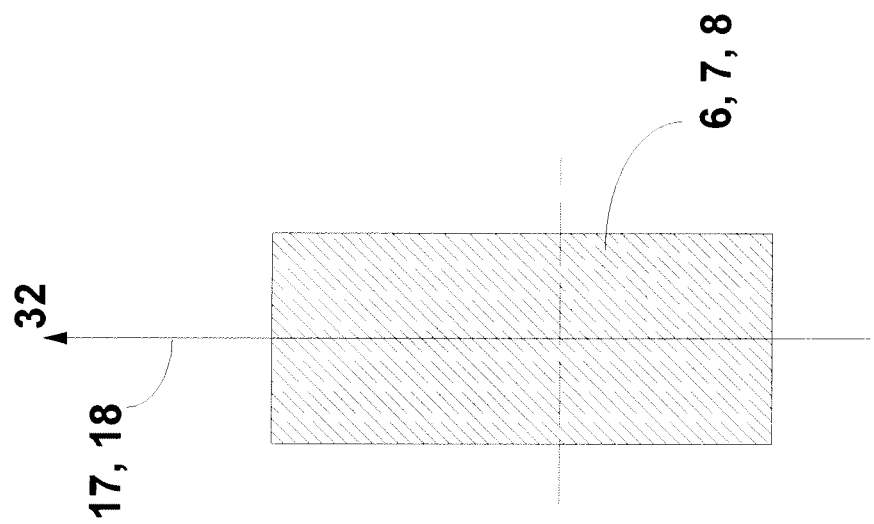
FIG. 4 shows a cross-sectional view of a rectangular beam.

Referring to FIG. 4, in the alternative embodiment of this invention, because of the symmetrical cross-section, the neutral axis 32 of the beams 6, 7, 8 substantially coincides with the normal axes 17, 18, the beams 6, 7, 8 having therefore the tendency to bend in a direction that is substantially parallel to the plane of the substrate 1, so that the primary oscillation may be initiated by an electrostatic excitation force that is substantially parallel to the plane of the substrate 1.

The electrostatic excitation applied to the masses 4, 5, causes them to vibrate in opposing phases substantially parallel to the plane of the substrate 1, which results in the masses 4, 5 experiencing relatively large gyroscopic moments when they are subjected to rotations around an axis 20 located in the plane of the substrate 1 and perpendicular to the beams 6, 7. The electrostatic excitation generally occurs at the resonant frequency for the intended movement. A capacitive detection scheme is employed to accurately quantify the rotations induced by the gyroscopic moments.

Figure 5:
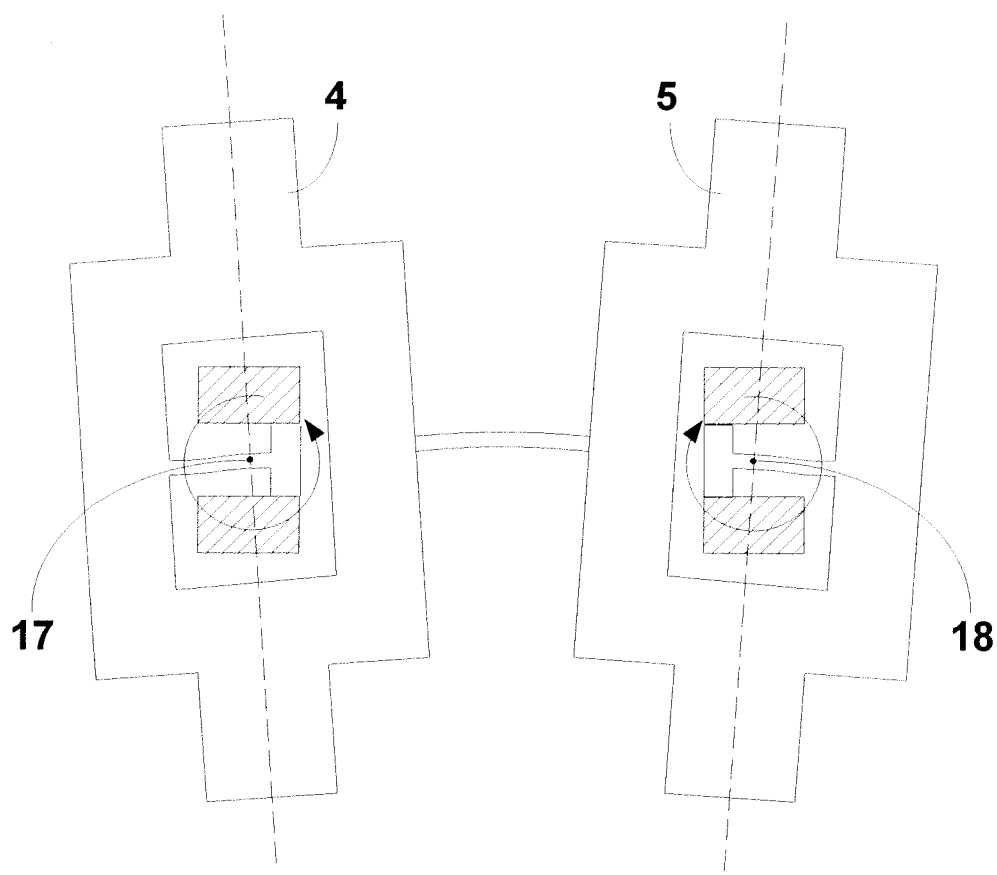
FIG. 5 shows the movable masses of the angular rate sensor in the primary (excitation) motion.

FIG. 5 shows the masses 4, 5 of an angular rate sensor according to the present invention in the primary (excitation) motion, with the masses 4, 5 oscillating, respectively, about the excitation axes 17, 18. The angular rate sensor is excited such that the primary motion is an opposite phase oscillation of the two seismic masses 4, 5 about the excitation axes 17, 18.

Figure 6:
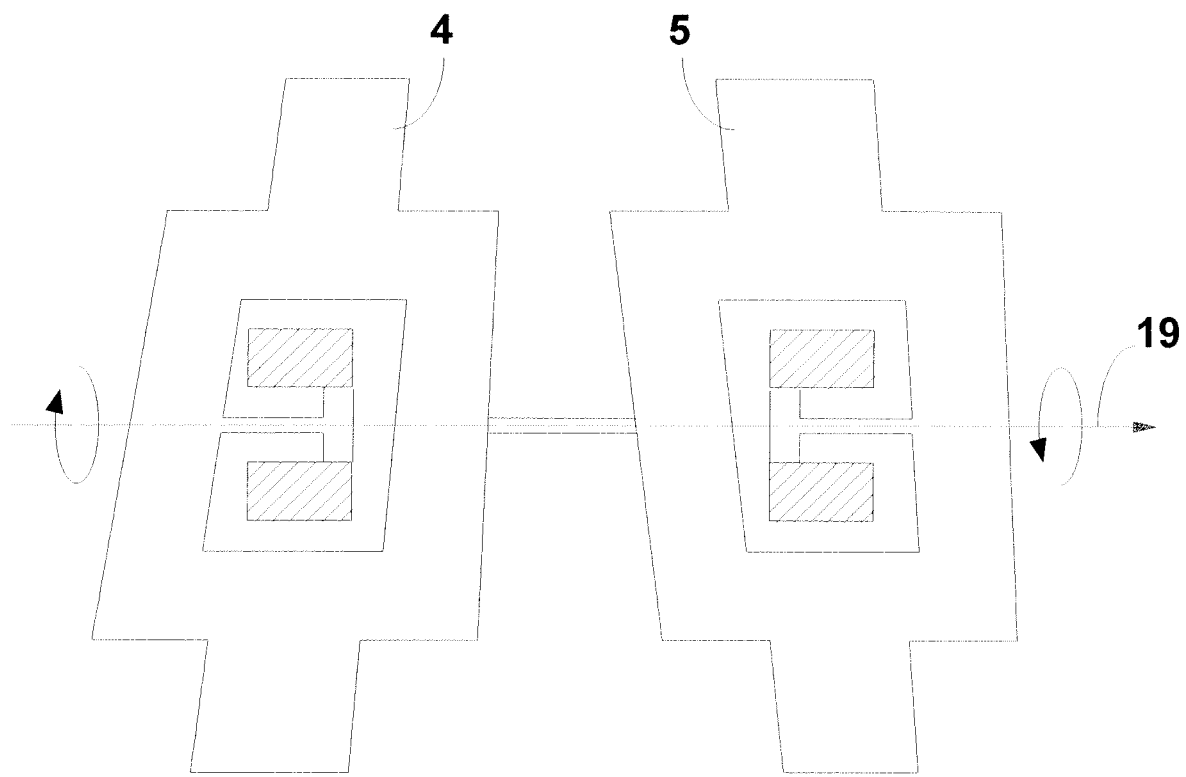
FIG. 6 shows the movable masses of the angular rate sensor in the secondary (detection) motion.

FIG. 6 shows the masses 4, 5 of an angular rate sensor according to the present invention in the secondary (detection) motion, oscillating about the detection axis 19. In the presence of an external angular velocity $\Omega$ oriented along the sensing axis 20, the opposite phase primary motion of the masses 4, 5 will generate oppositely directed Coriolis torque moments about the detection axis 19.

The amplitude of the oscillation caused by the external angular velocity is directly proportional to the external angular velocity $\Omega$ and the amplitude of the primary oscillation. The amplitude of the oscillation caused by the external angular velocity can be detected in a capacitive manner by means of electrodes positioned above and underneath the masses 4, 5, which electrodes are silicon portions 15, 16 of the top and bottom composite wafers 2, 3.

Figure 7:
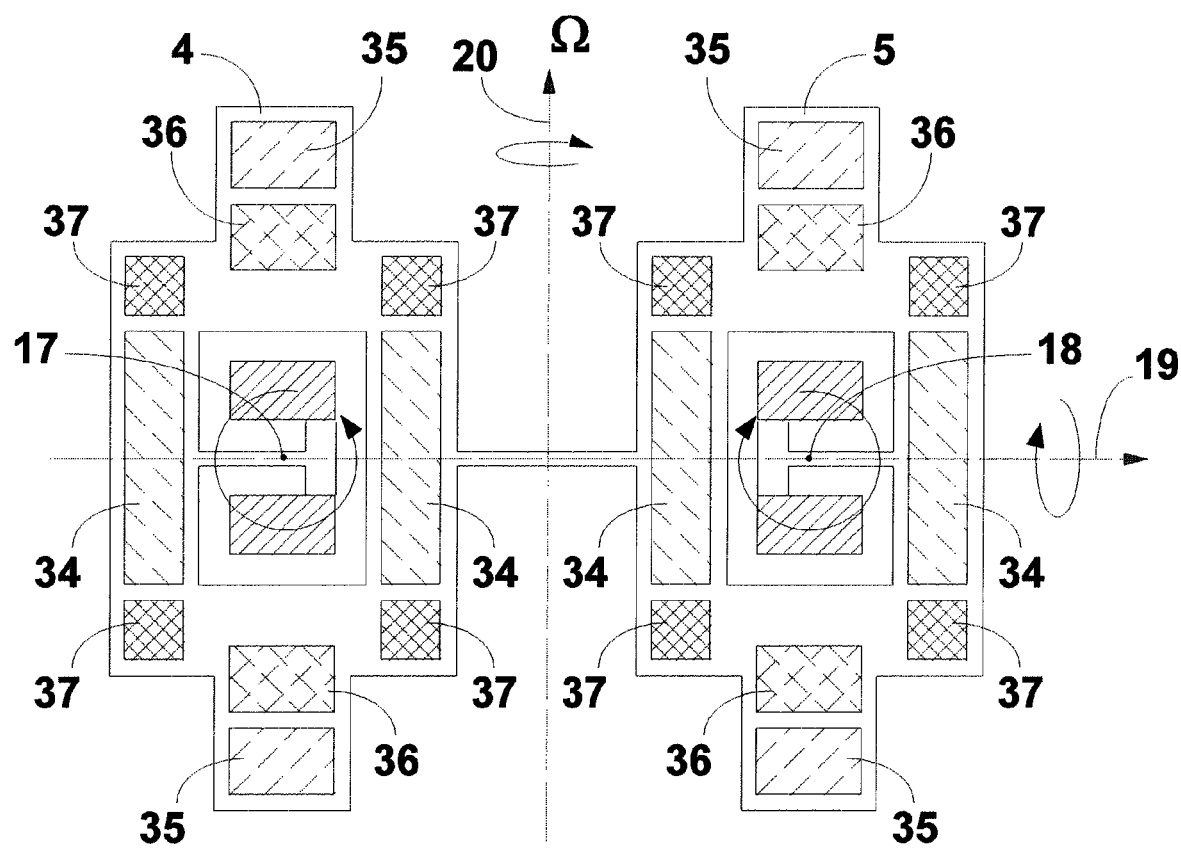
FIG. 7 shows a top view depiction of electrodes on an angular rate sensor.

FIG. 7 shows a number of electrodes 34, 35, 36, 37 in an example of an angular rate sensor according to the present invention wherein the beams 6, 7, 8 exhibit an asymmetric cross-section. In this case, excitation is applied in a direction perpendicular to the plane of the substrate 1 by means of compact electrodes.

Figure 8:
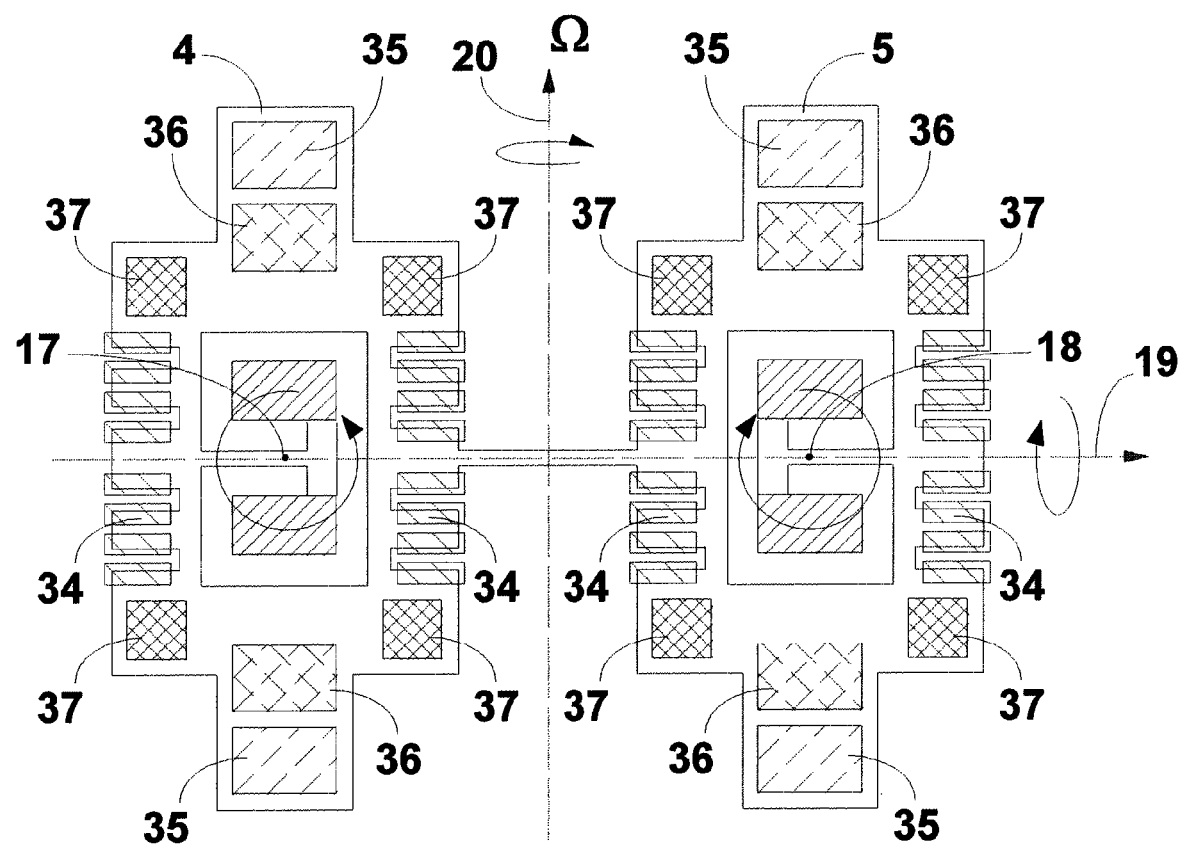
FIG. 8 shows a top view depiction of electrodes on an alternative arrangement of an angular rate sensor.

FIG. 8 shows a number of electrodes 34, 35, 36, 37 in an example of an angular rate sensor according to the present invention wherein the beams 6, 7, 8 exhibit a rectangular cross-section. In this arrangement, excitation is applied in a direction parallel to the plane of the substrate 1 by means of interdigitated electrodes.

Excitation electrodes 34, of which at least two pairs are defined in the silicon structure 15 of the top composite wafer 2 and at least two pairs are defined in the silicon portions 16 of the bottom composite wafer 3, are used to drive electrostatically the masses 4, 5 in opposite phase oscillations about the drive axes 17, 18. Conveniently, the very same excitation electrodes 34 are used to monitor and control the oscillation amplitude by means of an electronic closed feedback loop.

Detection electrodes 35, of which at least two pairs are defined in the silicon structure 15 of the top composite wafer 2 and at least two pairs are defined in the silicon structure 16 of the bottom composite wafer 3, are used to detect and control the opposite phase oscillations of the masses 4, 5 about the detection axis 19. Advantageously, the control of the secondary motion is achieved by means of an electronic closed feedback loop.

Adjust electrodes 36, of which at least two pairs are defined in the silicon structure 15 of the top composite wafer 2 and at least two pairs are defined in the silicon structure 16 of the bottom composite wafer 3, are used to match the frequencies of the excitation and detection oscillations in order to achieve the targeted precision. The frequency matching is realised by applying a tuneable, continuous voltage between the adjust electrodes 36 and the masses 4, 5.

Compensation electrodes 37, of which at least four pairs are defined in the silicon structure 15 of the top composite wafer 2 and at least four pairs are defined in the silicon structure 16 of the bottom composite wafer 3, are used to compensate quadrature bias in order to achieve a targeted bias stability. The quadrature bias is cancelled by applying a tuneable, continuous voltage between the compensation electrodes 37 and the masses 4, 5.

In an exemplary arrangement of the present invention, electrodes 34, 35, 36, 37 employed for excitation, detection, frequency adjustment and quadrature compensation, in combination with closed loop control of drive and sense modes, are arranged on both sides of the seismic masses in a substantially symmetrical pattern about perpendicular axes. This fully symmetrical, double sided arrangement gives the best performance of linearity, accuracy, noise and stability of oscillating tuning fork gyroscopes.

Figure 9:
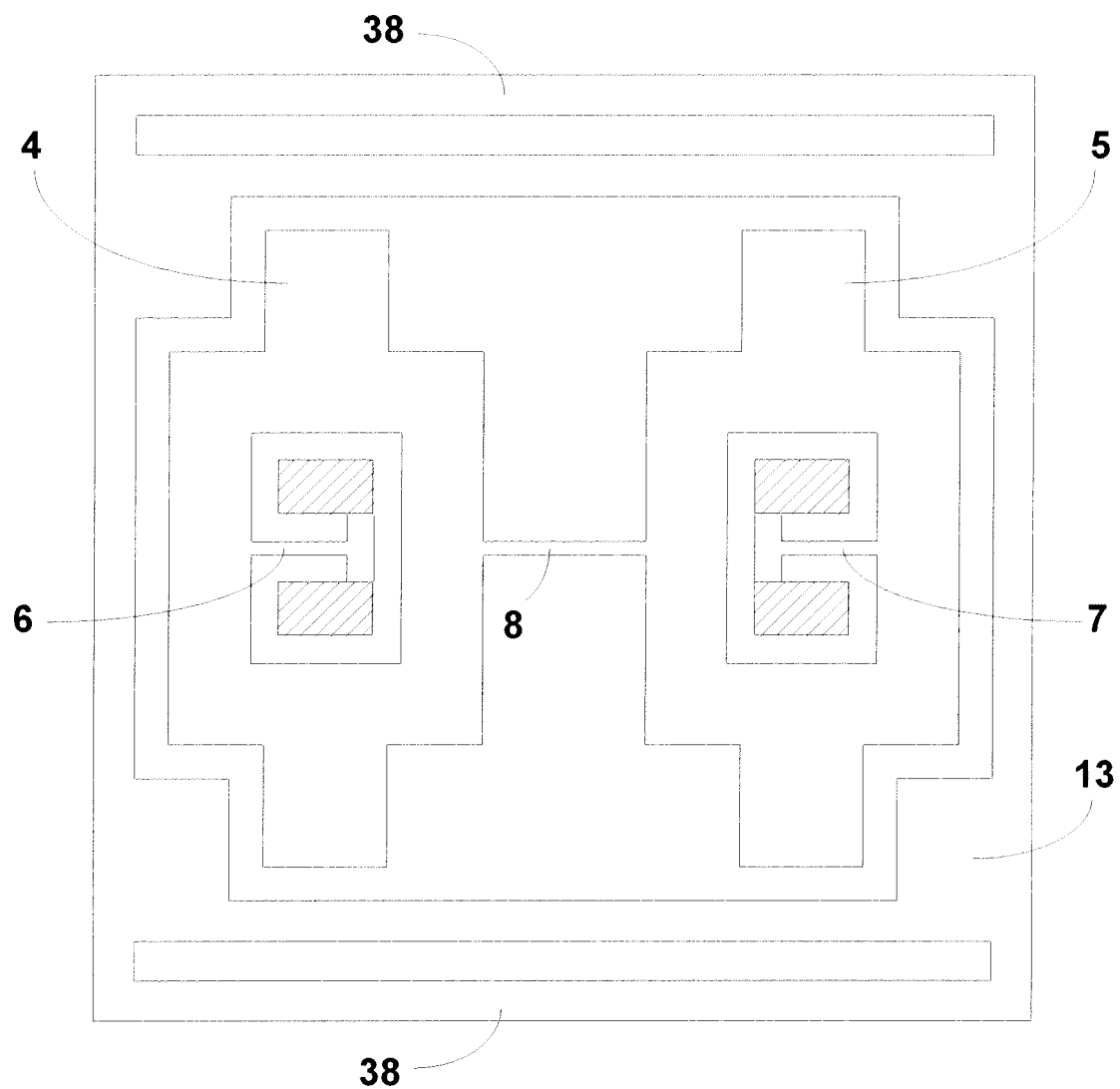
FIG. 9 shows a first example of an angular rate sensor in which stress release springs are employed.

In another example of the present invention, in order to minimise as much as possible the negative effects of externally originating mechanical and thermal loads, stress-release means, such as springs 38, are provided on at least two opposing lateral sides of the device, as illustrated in FIG. 9.

Figure 10:
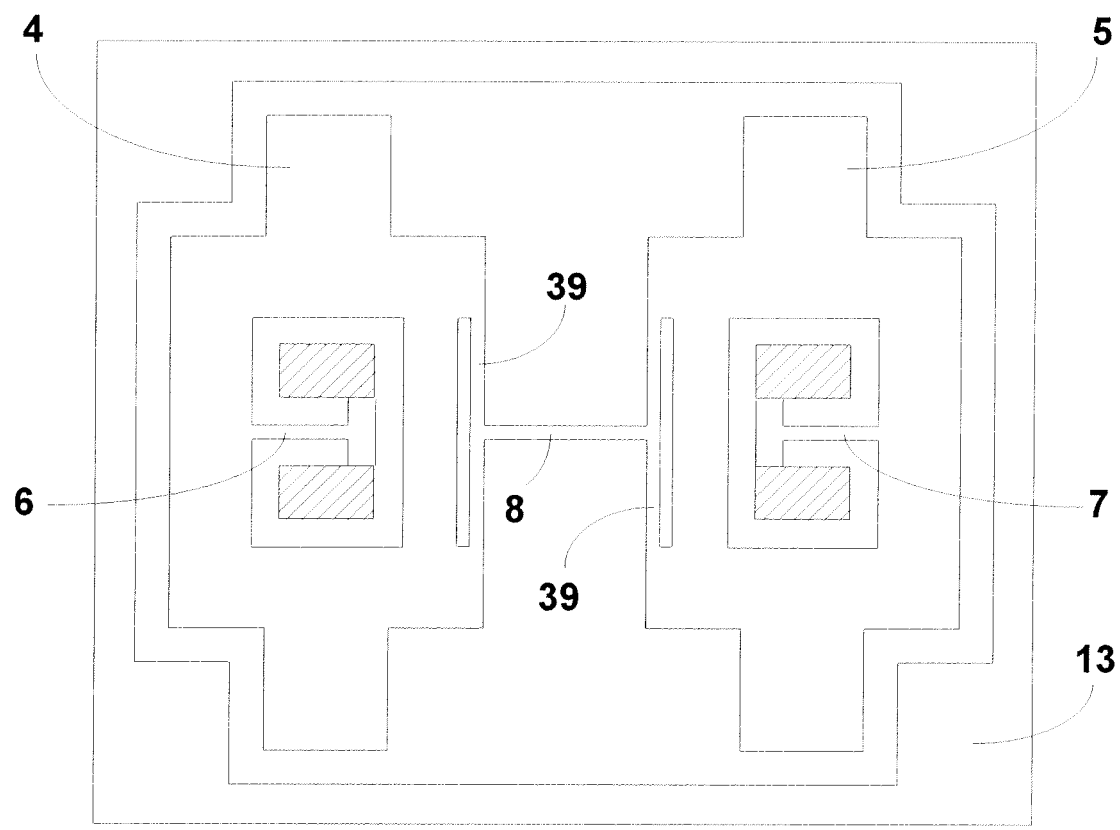
FIG. 10 shows a second example of an angular rate sensor in which stress release springs are employed.

In a further example of the present invention, in order to minimise as much as possible the negative effects of externally originating mechanical and thermal loads, stress-release springs 39 are provided at the ends of the connecting beam 8, as illustrated in FIG. 10.

Figure 11:
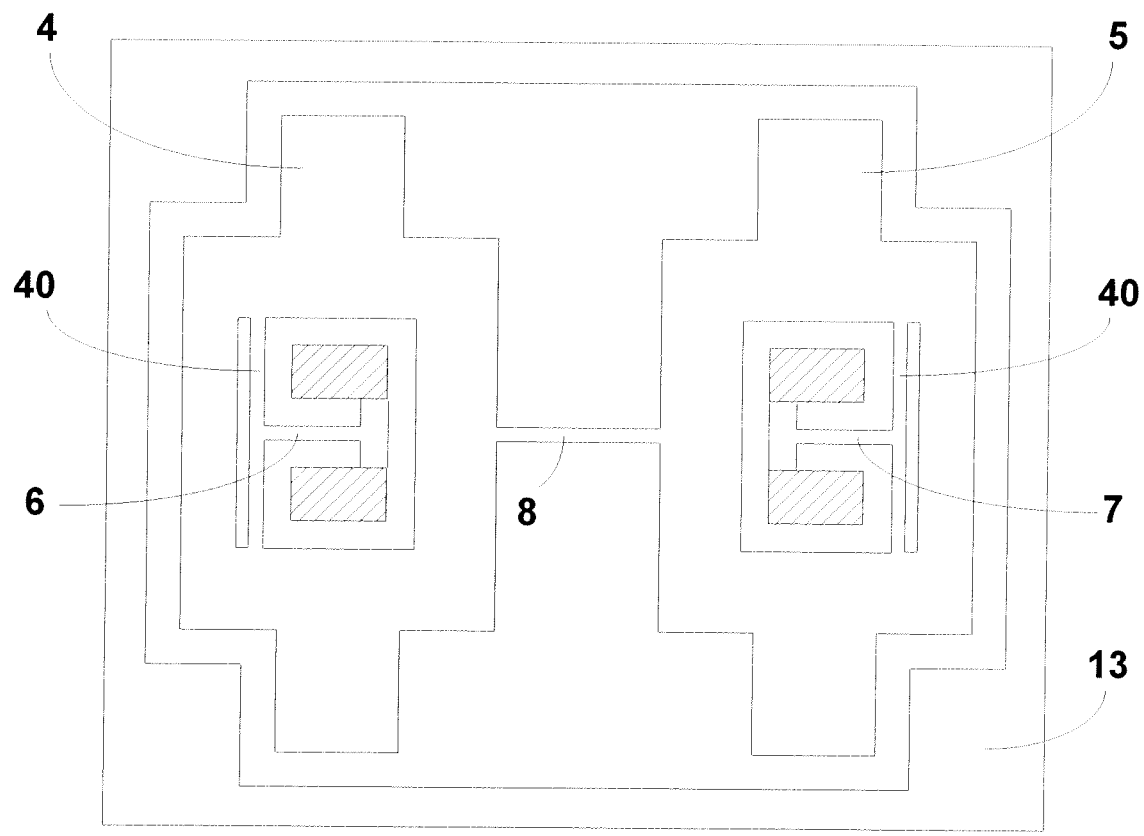
FIG. 11 shows a third example of an angular rate sensor in which stress release springs are employed.

In another example of the present invention, in order to minimize as much as possible the negative effects of externally originating mechanical and thermal loads, stress-release springs 40 are provided at at least one end of each driving beam 6, 7, as illustrated in FIG. 11.

In further embodiments of the present invention, in order to minimise as much as possible the negative effects of externally originating mechanical and thermal loads, stress-release components, such as springs, are provided as a combination of the previously listed embodiments.

The structure of the angular rate sensor according to the present invention has the advantage of reduced and efficient space usage, simplicity and extremely low sensitivity to external mechanical and thermal loads.

In addition to the structure described above, there are many other ways of enabling the two required degrees of freedom that will allow the measurement of angular rates according to and within the scope of the current invention. Such alternative structures are however larger, more complex and technologically challenging.

The high-stability feature of the angular rate sensor is achieved through full in-plane and cross-sectional symmetry of the design, combined with the choice of crystalline materials.

The invention claimed is:

1. A micro-electromechanical system (MEMS) structure for an angular rate sensor, the structure being positioned between first and second silicon-insulator composite wafers formed of a plurality of structured silicon parts, electrically isolated from each other by an insulator material, the structure comprising:
   a mono-crystalline silicon substrate structured to form a sensing system and a frame, the sensing system being completely de-coupled from and surrounded by the frame, which is positioned between engaging surfaces of the first and second composite wafers such that the sensing system is hermetically sealed within a cavity defined by the first and second composite wafers and the frame, the sensing system including:
      two seismic masses having front and back surfaces;
      two driving beams, each having a first end attached to a seismic mass and a second end attached to the first and second composite wafers by means of fixed pedestals provided on the silicon substrate; and
      a bending spring arranged to directly connect between, and synchronise a primary motion of, the two seismic masses,
      each of the seismic masses being arranged to have a first degree of rotational freedom about an axis that is substantially perpendicular to the plane of the silicon substrate, and
      the seismic masses and driving beams being arranged to have a second degree of rotational freedom about an axis substantially coincident with the longitudinal axis of the driving beams;
   means for generating and detecting the primary motion consisting of a primary oscillation of the two seismic masses, in opposing phases, in the first degree of rotational freedom;
   means for detecting a secondary motion consisting of a secondary oscillation of the two seismic masses, in opposing phases, in the second degree of rotational freedom,
   the means of generating and detecting the primary motion and the means of detecting a secondary motion being provided on both the front and back surfaces of each of the first and second seismic masses,
   wherein the sensing system is arranged such that, when the structure is subjected to an angular velocity around a third axis that is substantially in the plane of the silicon substrate and perpendicular to the longitudinal axis of the beams, a Coriolis force arises which causes the secondary oscillation of the seismic masses,
   wherein the engaging surface of the first composite wafer mirrors or matches the engaging surface of the second composite wafer,
   wherein the seismic masses, the pedestals, the means for generating and detecting the primary motion, and the means for detecting the secondary motion are symmetrically disposed about perpendicular axes,
   wherein the means for generating and detecting the primary motion involves the use, in a capacitive manner, of at least two fixed electrodes provided above and below each seismic mass,
   wherein the means for detecting the secondary motion involves the use, in a capacitive manner, of at least two fixed electrodes provided above and below each seismic mass; and
   means for adjusting the frequency of the oscillations, the adjustment being achieved in a capacitive manner using at least two fixed electrodes located above and below each seismic masses.

2. The structure of claim 1, further comprising means for compensating parasitic quadrature oscillations, the compensation being achieved in a capacitive manner using at least four fixed electrodes located above and below each seismic mass.

3. The structure of claim 2, further comprising recesses on the front and back surfaces of each seismic masses to provide capacitance gaps.

4. The structure of claim 3, wherein the beams exhibit a cross-sectional geometrical asymmetry such that the primary motion may be initiated by an excitation force that is substantially perpendicular to the front and back surfaces of the seismic masses.

5. The structure of claim 3, wherein the beams exhibit full cross-sectional symmetry such that the primary motion may be initiated by an excitation force that is substantially parallel to the front and back surfaces of the seismic masses.

6. The structure of claim 5, wherein the seismic masses and beams have substantially the same thickness and a symmetry axis of the seismic masses substantially coincides with the third axis.

7. The structure of claim 6, further comprising stress-release means arranged on at least two opposing sides of the silicon frame.

8. The structure of claim 6, further comprising stress-release means interposed between each end of the bending spring and the adjacent seismic mass, respectively.

9. The structure of claim 6, further comprising stress-release means interposed between each seismic mass and the adjacent driving beam, respectively.

10. The structure of claim 9, wherein the driving beams and the bending spring have substantially identical cross-sections.

11. The structure of claim 10, wherein the seismic masses have substantially identical geometry.

12. The structure of claim 11, further comprising a getter material that helps preserve a high vacuum inside the hermetically sealed cavity.

13. The structure of claim 12, further comprising silicon stoppers provided on the seismic masses.

14. A micro-electromechanical system (MEMS) structure for an angular rate sensor, the structure being positioned between first and second silicon-insulator composite wafers formed of a plurality of structured silicon parts, electrically isolated from each other by an insulator material, the structure comprising:

a mono-crystalline silicon substrate structured to form a sensing system and a frame, the sensing system being completely de-coupled from and surrounded by the frame, which is positioned between engaging surfaces of the first and second composite wafers such that the sensing system is hermetically sealed within a cavity defined by the first and second composite wafers and the frame, the sensing system including:

two seismic masses having front and back surfaces;

two driving beams, each having a first end attached to a seismic mass and a second end attached to the first and second composite wafers by means of fixed pedestals provided on the silicon substrate; and a bending spring arranged to directly connect between, and synchronise a primary motion of, the two seismic masses, each of the seismic masses being arranged to have a first degree of rotational freedom about an axis that is substantially perpendicular to the plane of the silicon substrate, and the seismic masses and driving beams being arranged to have a second degree of rotational freedom about an axis substantially coincident with the longitudinal axis of the driving beams;

at least two fixed electrodes provided above and below each seismic mass on both the front and back surfaces of each of the first and second seismic masses for generating and detecting the primary motion consisting of a primary oscillation of the two seismic masses, in opposing phases, in the first degree of rotational freedom;

at least another two fixed electrodes provided above and below each seismic mass on both the front and back surfaces of each of the first and second seismic masses for detecting a secondary motion consisting of a secondary oscillation of the two seismic masses, in opposing phases, in the second degree of rotational freedom; and a further at least two electrodes located above and below each seismic mass for adjusting the frequency of the oscillations, wherein the sensing system is arranged such that, when the structure is subjected to an angular velocity around a third axis that is substantially in the plane of the silicon substrate and perpendicular to the longitudinal axis of the beams, a Coriolis force arises which causes the secondary oscillation of the seismic masses, wherein the beams exhibit a cross-sectional geometrical asymmetry such that the primary motion may be initiated by an excitation force that is substantially perpendicular to the front and back surfaces of the seismic masses.

* * * * *